A. S. DEBOSE.
BRACKET FOR SUPPORTING CURTAIN POLES AND SHADE ROLLERS.
APPLICATION FILED FEB. 13, 1909.
945,494.
Patented Jan. 4, 1910.
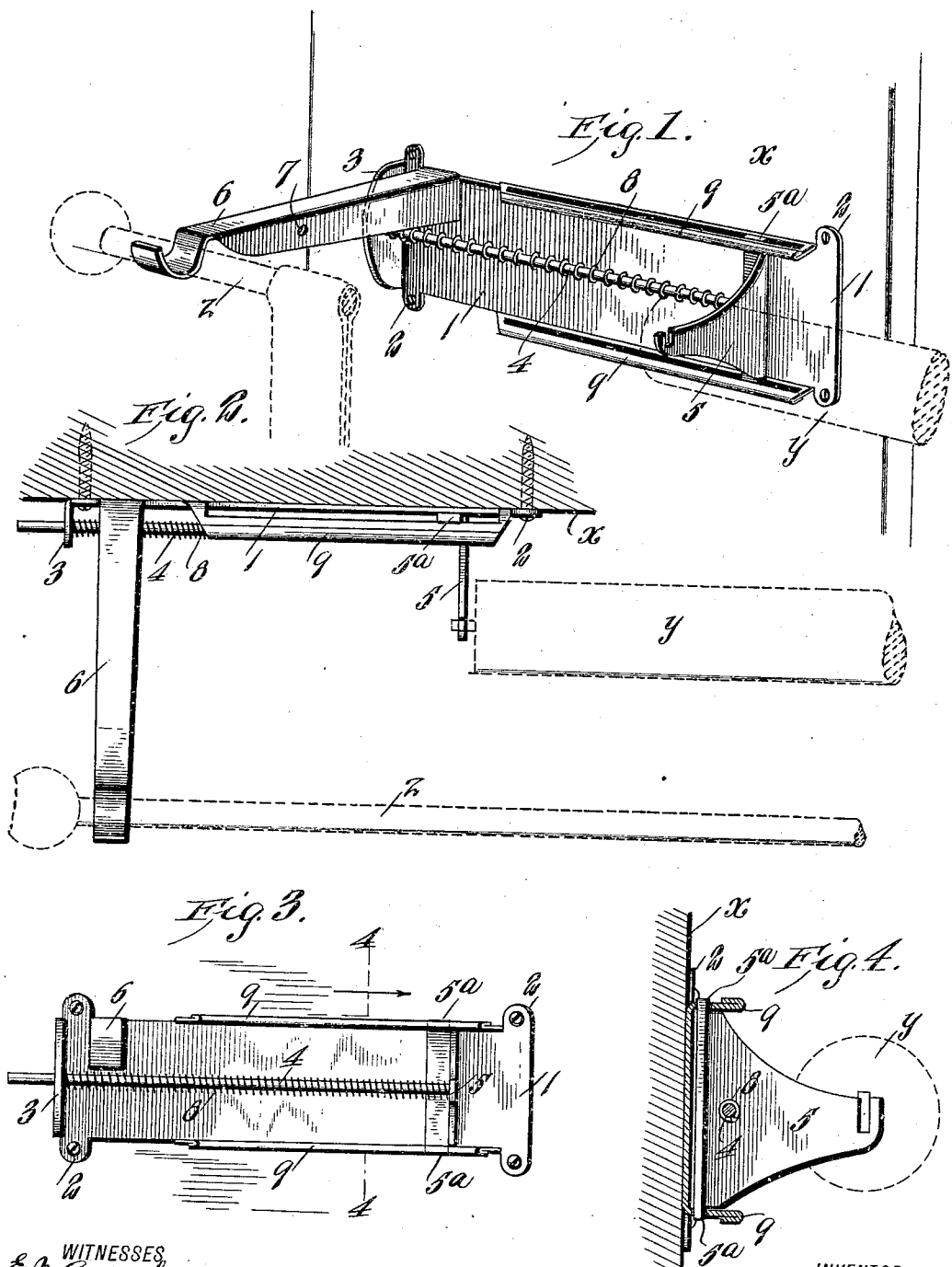
WITNESSES
E. M. Callaghan
Amos K. Hart
INVENTOR
ALBERT S. DEBOSE
BY Munn & Co.
ATTORNEYS

UNITED STATES PATENT OFFICE.

ALBERT S. DEBOSE, OF SPRINGFIELD, ILLINOIS.

BRACKET FOR SUPPORTING CURTAIN-POLES AND SHADE-ROLLERS.

945,494.  Specification of Letters Patent.  Patented Jan. 4, 1910.

Application filed February 13, 1909.  Serial No. 477,544.

*To all whom it may concern:*

Be it known that I, ALBERT S. DEBOSE, a citizen of the United States, residing at Springfield, in the county of Sangamon, State of Illinois, have invented an Improvement in Brackets for Supporting Curtain-Poles and Shade-Rollers, of which the following is a specification.

Brackets have been constructed which support curtain-poles and shade-rollers, so that they combine two functions, but they have been made of so many parts and otherwise constructed in such manner as to be comparatively expensive, besides being unsatisfactory in other respects.

My invention, while displaying a marked degree of novelty, is distinguished by the utmost simplicity of construction, it being made of three parts, whereby it may be produced at minimum cost.

Figure 1 is a perspective view of my improved fixture arranged as in use. Fig. 2 is a plan view of the same and illustrating the attachment of a curtain-pole and roller support. Fig. 3 is a face view of the fixture. Fig. 4 is an enlarged cross-section on the line 4—4 of Fig. 3.

The body 1 of the bracket is a flat plate provided with perforated ears 2 at its corners, and with a perforated end flange 3, and parallel top and bottom side flanges 9, which are slotted. The plate is provided with a rigid, forwardly extended arm 6, which is formed integrally therewith, and provided at its outer end with a hook for supporting a curtain-pole $z$. The arm 6 is also provided with a hole 7 to receive the pintle, or pivot, of a smaller rod or pole, if one should be used. The hook 5 is provided with ears $5^a$ that enter, and are adapted to slide in, the slots of the side flanges 9. This hook serves to support one end of a shade-roller $y$. A rod 4 is attached to it, and slides in the hole of the end flange 3, and a wire spring 8 is coiled about it and presses against the hook so that the latter is held firmly in contact with the shade-roller $y$ (shown by dotted lines Figs. 1 and 2).

It will be seen that all the parts, save the hook 5 and the rod and spring, are formed integrally or in one piece, and may, therefore, be produced at minimum cost.

The bracket may be secured to a wall $x$ by screws passing through the perforated lugs 2.

What I claim is:

The improved bracket for supporting curtain-poles and shade-rollers, comprising a flat body having parallel, forwardly projecting, slotted flanges, a perforated end flange, and a lateral arm provided with a hook, all constructed integrally, a hook 5 having ears adapted to slide in the slots of the aforesaid flanges, a guide rod connected with such hook, and a spring encircling the rod and pressing against the hook, as and for the purposes specified.

ALBERT S. DEBOSE.

Witnesses:
LEOPOLD H. GREEN,
GEO. E. AYRES.